United States Patent [19]
Best et al.

[11] Patent Number: 5,113,437
[45] Date of Patent: May 12, 1992

[54] SIGNAL IDENTIFICATION SYSTEM

[75] Inventors: Stuart J. Best, Harlington; Nigel Johnson, Windlesham; Adrian M. Sandford, Hayes, all of England

[73] Assignee: Thorn EMI plc, London, England

[21] Appl. No.: 426,284

[22] Filed: Oct. 25, 1989

[30] Foreign Application Priority Data

Oct. 25, 1988 [GB] United Kingdom ............... 8824969

[51] Int. Cl.⁵ ........................................... G11B 23/28
[52] U.S. Cl. ........................................ 380/3; 380/19; 360/60
[58] Field of Search ...................... 380/3, 19; 360/60

[56] References Cited

U.S. PATENT DOCUMENTS 4,156,205  5/1979  Kadin et al.
4,325,089  4/1982  Hsu ............................................. 380/3
4,802,212  1/1989  Freeman ..................................... 380/3
4,876,617  10/1989 Best et al. ................................. 360/68

FOREIGN PATENT DOCUMENTS 135192   3/1985  European Pat. Off. .
0245037  4/1987  European Pat. Off. .

Primary Examiner—Thomas H. Tarcza
Assistant Examiner—David Cain
Attorney, Agent, or Firm—Fleit, Jacobson, Cohn, Price, Holman & Stern

[57] ABSTRACT

A signal identification system, suitable for producing an identification code on a sound track recording is described. The system includes an encoder 209 effective to eliminate a variable sequence of frequency bands from an audio signal and insert a sequence of code signals into the frequency bands. As the sequence of frequency bands varies throughout the sound track recording, the presence of the code is difficult to detect.

10 Claims, 6 Drawing Sheets

SIGNAL IDENTIFICATION SYSTEM

This invention relates to signal identification systems. In particular the invention related to systems in which a code is superimposed on a signal so as to enable the subsequent identification of the signal. Such systems have particular application in, for example, the recording industry for providing information on a sound recording so as to identify the origin of the recording, the owner of the copyright in the recording, or whether any copyright royalties are due.

In our copending European patent application EP 0245037 there is described a system for producing an identification code on a sound track recording, the system including an encoder circuit effective to eliminate two predetermined frequency bands from an audio signal to form notches in the signal. The encoder circuit inserts a signal in the form of a suitable identification code sequence into these notches, the code signal consisting of pulses at the centre frequencies of the notches one value of each digit of the code sequence being represented by one of the frequencies and a different value of each digit being represented by the other frequency.

Using such a system it is possible to insert an identification code into a high fidelity audio signal in such a way that the code is inaudible but is recoverable, using either digital or analogue techniques. The system does, however, have a potential security problem in that it would be possible for a potential defrauder such as a home-copier to filter out the code signal by the use of narrow notch filters operating at the same frequencies as used in the original encoding process. Whilst this would not produce any significant degradation to the audio quality, the code would then be undetectable.

It is an object of the present invention to provide a system which is suitable for producing an identification code on a sound track recording wherein it is more difficult to filter out the code signal without degradation of the audio signal.

According to a first aspect of the present invention a signal identification system comprises encoding means comprising: means for choosing a variable sequence of frequency bands from a plurality of different predetermined frequency bands in the bandwidth of a given signal; means for eliminating the sequence of chosen frequency bands from the given signal to form a sequence of corresponding notches in the given signal; and means for inserting a sequence of code signals into the notches, each code signal comprising frequencies within the bandwidth of the notch or notches into which it is inserted; and decoding means for determining whether the sequence of code signals is present in the given signal.

Thus in a system in accordance with the invention, any attempt by a defrauder to remove or interfere with all possible notch frequency bands simultaneously will result in significant distortion of the audio signal as the notch frequency bands may be spread over a wide range of the signal spectrum. Whilst it may be possible to detect the presence of individual notches and filter out the data within each notch frequency band, this would require sophisticated signal processing means beyond the abilities, of at least the average home copier. Furthermore as the notches may move around the signal spectrum in a pseudo-random manner, the presence of the code will be more difficult to detect, either audibly where the signal is an audio signal, or using electronic test gear.

In a preferred system in accordance with the invention there are at least three different predetermined frequency bands, each code signal comprising frequencies within two different predetermined frequency bands.

The invention also provides for an encoding system for the coding of a given signal comprising: means for choosing a variable sequence of frequency bands from a plurality of different predetermined frequency bands in the bandwidth of a given signal; means for eliminating the sequence of chosen frequency bands from the given signal to form a sequence of corresponding notches in the given signal; and means for inserting a sequence of code signals into the notches, each code signal comprising frequencies within the bandwidth of the notch or notches into which it is inserted.

One signal identification system in accordance with the invention will now be described, by way of example only, with reference to the accompanying drawings in which.

The system to be described is designed to produce identification coding signals on a high fidelity musical sound track, and is an adaptation of the system described in Applicant's copending European Patent Application EP 0245037 which is hereby incorporated by reference.

Figure 1:
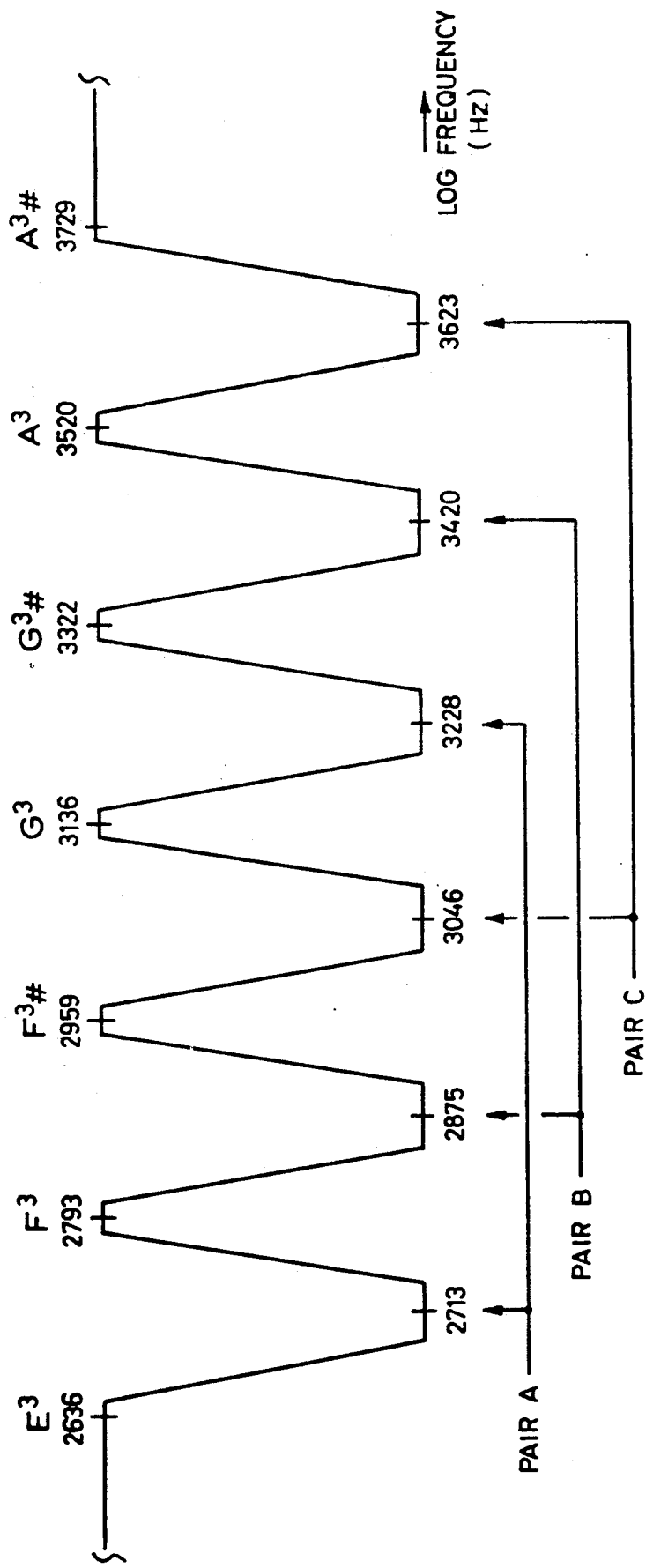
FIG. 1 shows a selection of six possible notch frequency bands for use in a stereo musical recording signal.

Referring firstly to FIG. 1, the system to be described is designed to use code signals incorporated within a choice of three different combinations of pairs of notch frequency bands, chosen from a total of six different notch frequency bands within the frequency spectrum of the musical track. The six frequency bands are positioned, as shown in FIG. 1 midway between each of the musical notes E3 to A3. There are thus 15 possible combinations of pairs of frequency bands. In order to simplify the system however, in particular reduce the number of decoders which will ultimately be required to decode the coded audio signal, in the particular example being described, the number of allowable combinations is restricted to three, i.e. the pairs A, B and C indicated in the figure. It will be seen that it is the minimum number of combinations which ensures that each notch frequency band is used at least once.

Figure 2:
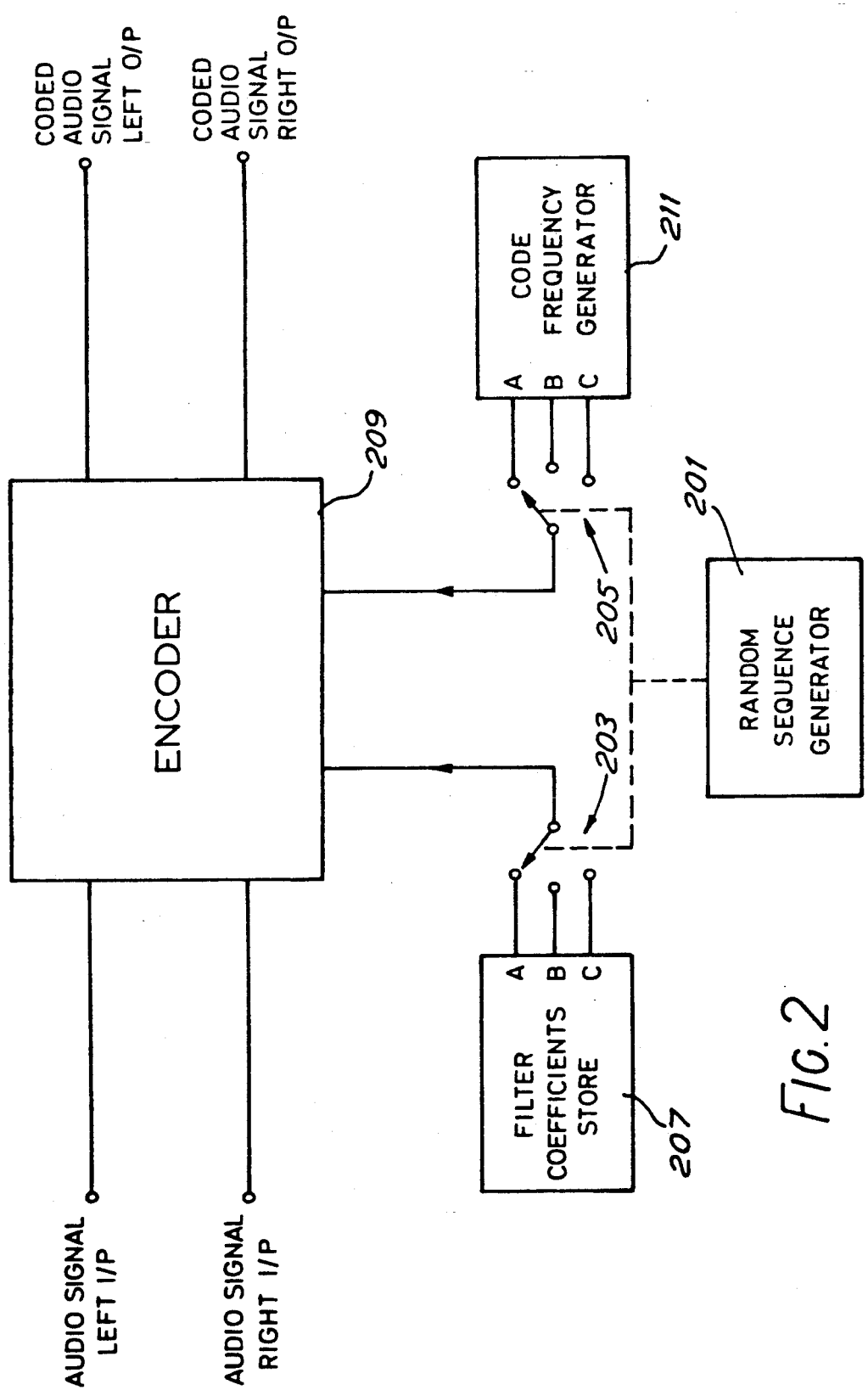
FIG. 2 is a schematic block diagram of an encoding apparatus for the system.
Figure 3:
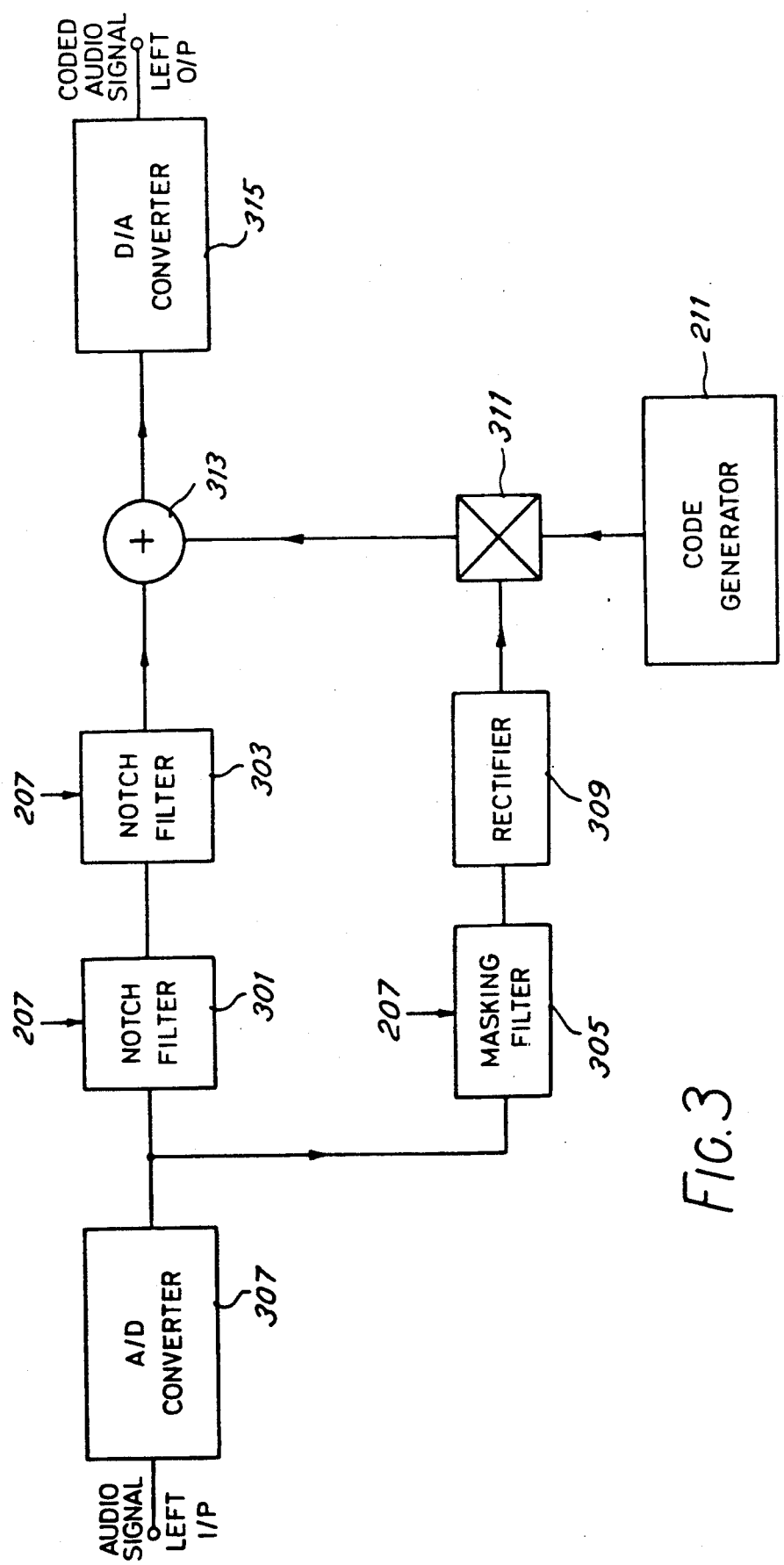
FIG. 3 is a more detailed schematic block diagram of part of the encoding apparatus of FIG. 2.

Referring now also to FIGS. 2 and 3, in which corresponding components are correspondingly labelled a random sequence generator 201 is used to choose in which of the possible combinations A, B, C of the pairs of frequency bands the coding signal is to lie, and operates two switches 203, 205 accordingly. A filter coefficients store 207 acting under the control of the random sequence generator 201 loads an appropriate software signal into appropriate digital signal processing (DSP) chips in an encoder 209 to program two notch filters, indicated as 301 and 303 in FIG. 3, at the respective appropriate centre of the chosen frequency band frequencies i.e. 2713 Hz and 3228 Hz in the case of pair A. The filter coefficients store 207 is also effective to program a masking filter, indicated as 305 in FIG. 3. A code frequency generator 211, also responsive to the random sequence generator 201 generates binary coding pulses at the centre frequencies of the two notch filters 301, 303, the 2713 Hz pulses representing a space or zero in each data bit of the coding signal, and the 3228 Hz pulses representing a mark or one in each data bit or vice versa in the case where pair A is chosen.

Referring now particularly to FIG. 3 which illustrates only the left hand audio signal encoder, the right hand audio signal encoder being of equivalent construction, in use of the encoder system each audio signal channel is applied, via an analogue to digital converter 307 if the audio signal is not already a digital signal, to the notch filters 301, 303. The digitised audio signal is also applied to a control branch of the encoder including the masking filter 305, the output of the masking filter 305 being applied via a rectifier 309 to a multiplier 311 to which the output of the code generator 211 is also applied. The output of the multiplier 311 is connected to an adder 313, which in use of the encoder produces the required coded audio signal via a digital to analogue converter 315.

Thus in use of the encoding system the notch filters 301, 303 produce a sequence of notches in the audio signal, at the frequency bands determined by the random sequence generator 201, each notch being encoded with the appropriate code signal at the appropriate frequency as described in more detail in European Patent Application EP 0245037 The control branch including the masking filter 305 ensures that the amplitude of the code signal will not be determined by the amplitude of the audio signal at frequencies either high or low, which do not adequately mask the code signal. The multiplier 311 ensures that the amplitude of the code signals may be kept at a fixed level below the amplitude of the audio signal.

Figure 4:
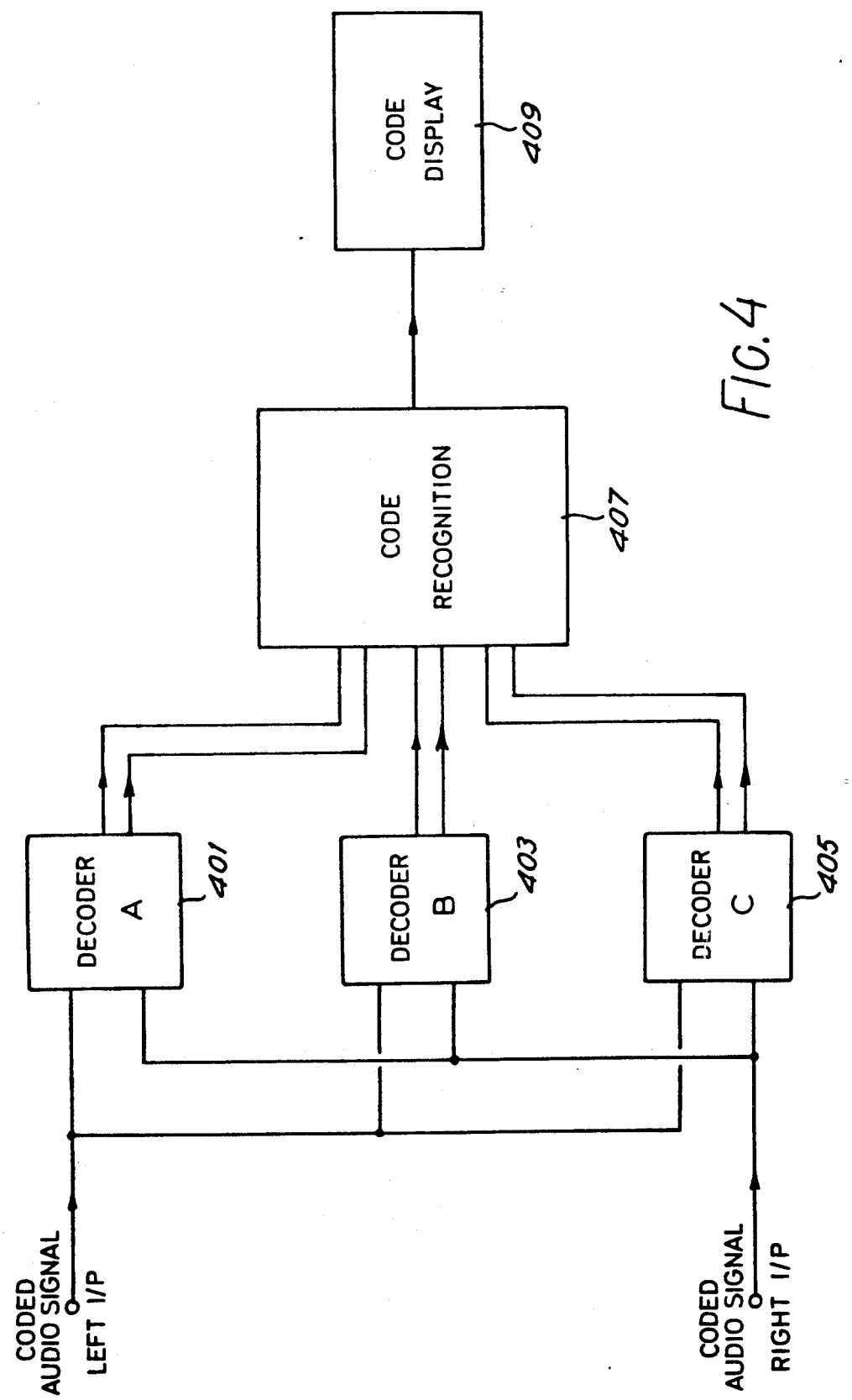
FIG. 4 is a schematic block diagram of a decoding system.
Figure 5:
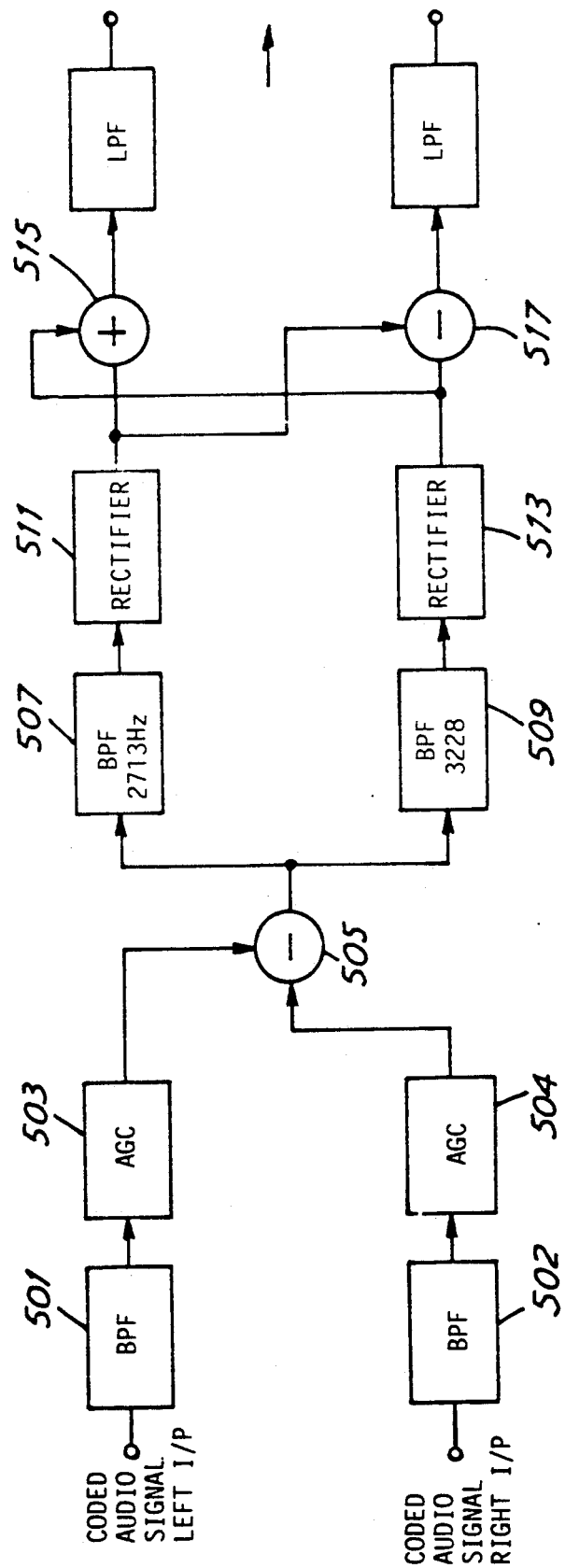
FIG. 5 is a more detailed schematic diagram of one of the decoders shown in FIG. 4.

Turning now to FIGS. 4 and 5, in order to decode the signal, it is necessary to provide three decoders 401, 403, 405 connected in parallel, each decoder being responsive to one of the possible combinations of pairs of notch frequency bands A, B, C. Each decoder 401, 403, 405 is identical and is of the form shown in FIG. 5. Referring now particularly to FIG. 5, each channel of the encoded stereo signal is separately filtered within each decoder 401, 403, 405 by an initial bandpass filter 501, 502 effective to isolate the code frequencies from the stereo signal. An automatic gain controller unit 503, 504 adjusts the amplitude of the code signals to a uniform level. The difference between outputs of the units 503, 504 is then produced at subtractor 505 to provide a signal incorporating the full 32 bit code plus any preamble. The 2713 Hz "space data bit" and 3227 Hz "mark data bit" signals are then separated by means of appropriate band pass filters 507, 509, and rectified by respective rectifiers 511, 513. The bandwidth of the filters 507, 509 will generally be made wider than the notches formed in the audio signal to allow for speed variation in the reproducing equipment. This will allow some programme breakthrough into the code demodulation, thus resulting in occasional code mutilation. This is overcome by combining the complementary code sequences produced by the rectifiers 511, 513 in both an adder 515 and a subtractor 517. The output of the subtractor 517 should, therefore produce a double amplitude code signal, with the output of the adder 515 being zero in the absence of programme breakthrough, any programme breakthrough thus being detectable and compensatable for. Referring now again to FIG. 4 the outputs of the three decoders 401, 403, 405 are monitored by a suitable code recognition means 407, such that when a valid code signal is produced, it is identified and displayed on a suitable code display means, for example a VDU or a printer. The code recognition means 407 will also be effective to recognise and compensate for any programme breakthrough. Generally the outputs from the decoder system will be examined in the code recognition means 407 to check that the expected pattern of code sequences is present, or whether there has been any attempt to remove the code.

It will be appreciated that whilst the decoder system must decode signals from all the available combinations of two notches provided by the total number of notch frequencies in use, using fast DSP integrated circuits it will be possible to implement several decoding units within one DSP chip, all responsive to the same coded audio signal input, but examining different notch combinations. By implementing the decoder system so as to examine simultaneously all known possible notch combinations, the decoder system does not require any knowledge of the sequence in which the notch frequencies are generated by the random sequence generator 201. The provision of such knowledge would, however, enable the decoder system to be simplified.

It will be appreciated that whilst in the signal coding system described herebefore by way of example, there are only three possible combinations of notch frequencies, i.e. A, B, C, in practice a larger number of combinations may be used, although this will generally lead to a more complex decoder system. In the case of the encoder 209 however, as this is implemented by means of DSP chips, only one pair of notch filters 301, 303 and one masking filter 305 will be required per channel of the audio signal. Thus any required sequence of notch frequencies may be produced merely by software implementation. It will be appreciated however that whilst it is particularly advantageous to implement a system in accordance with the invention in digital form, it is also possible to implement the system in analogue form.

Figure 6:
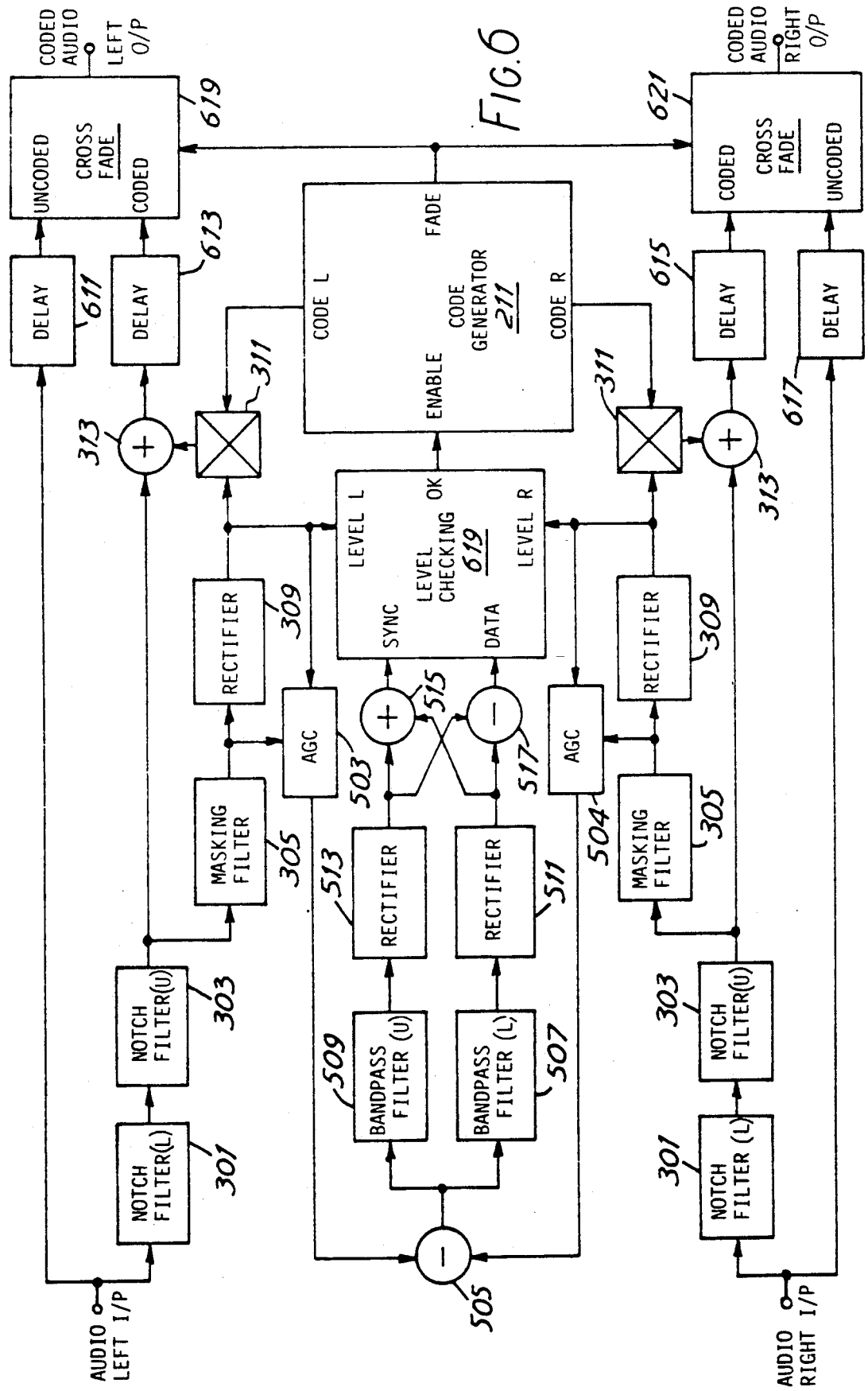
FIG. 6 is a schematic block diagram of an alternative encoding apparatus to that shown in FIG. 3.

It will be appreciated that further levels of sophistication may be incorporated in a system in accordance with the invention. An example of a more sophisticated encoder is shown in FIG. 6, in which corresponding features to those shown in the encoder of FIG. 3 and the decoder of FIG. 5 are correspondingly labelled, and both right and left stereo channels are shown. The encoder shown in FIG. 6 incorporates a code truncation means effective to prevent insertion of the code in an audio signal if the content of the signal is not suitable to allow insertion of a complete code sequence, or if it appears that the code would not be successfully decoded. The encoder thus incorporates delay means 611, 613, 615, 617 effective to produce a delay of for example approximately one second in the audio signal path. This delay enables a level checking section 619 to monitor the audio signal derived from the left and right notched input signals via a decoder section incorporating bandpass filters 507, 509 respectively set at the appropriate upper and lower notch frequency bands, and rectifiers 511, 513 together with suitable adders and subtractors 505, 515, 517 as shown. Respective automatic gain control units 503, 504 are provided in respect of each channel, these being effective to constantly change the gain of the masked music signal path, such that if it is well coded the code would remain at a constant level. The level checking section 619 thus ensures that if the amplitude of the code is so low as to be unrecoverable in a particular section of the audio signal, the code will not be inserted. The interference from the audio signal is also checked to ensure that the code will not be severely corrupted. The code generator 211 is thus responsive to an enabled signal from the level checking system, so as to generate complete code sequences if the audio signal remains suitable for the duration of a sequence. The timing of the system is arranged such that as the code sequence ends, the start of that same sequence will be emerging from the delay units 611, 613, 615, 617. The coded signal is then cross-faded via cross fade units 619, 621 under the control of the code generator 211 to the output for the duration of the sequence.

It will also be appreciated that whilst it is particularly advantageous for each coding signals to be inserted in the incoming signal at two different frequencies, the invention is also applicable to signal coding systems in which the code is inserted in the signal at a single frequency, e.g. as described in U.S. Pat. No. 3,845,391.

We claim:

1. A signal identification system comprising: encoding means comprising means for choosing a variable sequence of frequency bands from a plurality of different predetermined frequency bands in the bandwidth of a given signal; means for eliminating the chosen sequence of frequency bands from the given signal to form a sequence of corresponding notches in the given signal; and means for inserting a sequence of code signals into the notches, each code signal comprising frequencies within the bandwidth of the notch or notches into which it is inserted; and decoding means including delay means adapted to delay the insertion of the code signals into the notches until the decoding means ascertains that the amplitude of the code signal is sufficient to be detectable within the given signal, and to determine whether the code signal is present in the given signal.

2. A system according to claim 1 in which there are at least three different predetermined frequency bands, each code signal comprising frequencies within two different predetermined frequency bands.

3. A system according to claim 2 in which the code signals within each of the two different predetermined frequency values represent respective different binary values.

4. A system according to claim 1 in which the decoding means further includes means for inspecting all possible combinations of the predetermined frequency bands in a given signal simultaneously.

5. A system according to claim 1 in which the variable sequence is a predetermined sequence and the decoding system includes means for inspecting predetermined frequency bands in the order of the predetermined sequence.

6. An encoding system for the coding of a given signal comprising: means for choosing a variable sequence of frequency bands from a plurality of different predetermined frequency bands in the bandwidth of a given signal; means for eliminating the sequence of chosen frequency bands from the given signal to form a sequence of corresponding notches in the given signal; and means for inserting a sequence of code signals into the notches, each code signal comprising frequencies within the bandwidth of the notch or notches into which it is inserted.

7. A system according to claim 6 in which there are at least three different predetermined frequency bands, each code signal comprising frequencies within two different predetermined frequency bands.

8. A system according to claim. 7 in which the code signals within each of the two different predetermined frequency values represent respective different binary values.

9. A system according to claim 6 in which the encoding means includes means for inhibiting the insertion of the code signal into the notches where the code signal is not likely to be detectable.

10. A decoding system for decoding a signal in which a code signal has been incorporated in a variable sequence of predetermined frequency bands in the signal, the decoding system including means for inspecting a plurality of combinations of the predetermined frequency bands.

* * * * *